US008428756B2

(12) United States Patent
Matsuoka

(10) Patent No.: US 8,428,756 B2
(45) Date of Patent: Apr. 23, 2013

(54) DATA EMBEDDING DEVICE, DATA EMBEDDING METHOD, DATA EXTRACTION DEVICE, AND DATA EXTRACTION METHOD

(75) Inventor: Hosei Matsuoka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1059 days.

(21) Appl. No.: 11/913,849

(22) PCT Filed: Jul. 7, 2006

(86) PCT No.: PCT/JP2006/313570

§ 371 (c)(1), (2), (4) Date: Nov. 8, 2007

(87) PCT Pub. No.: WO2007/007666

PCT Pub. Date: Jan. 18, 2007

(65) Prior Publication Data

US 2009/0018680 A1 Jan. 15, 2009

(30) Foreign Application Priority Data

Jul. 11, 2005 (JP) ................................ 2005-202130

(51) Int. Cl.
*G06F 17/00* (2006.01)

(52) U.S. Cl.
USPC .................................... 700/94; 704/E19.009

(58) Field of Classification Search .................... 700/94; 704/E19.009
See application file for complete search history.

(56) References Cited

U.S. PATENT DOCUMENTS 3,919,479 A * 11/1975 Moon et al. .................. 704/237
5,490,511 A * 2/1996 Amemiya et al. ............ 600/437
7,460,991 B2 * 12/2008 Jones et al. .................. 704/211
7,505,823 B1 * 3/2009 Bartlett et al. .................. 700/94
2005/0033579 A1 * 2/2005 Bocko et al. .................. 704/273

FOREIGN PATENT DOCUMENTS

JP 11 110913 4/1999
JP 2003 216171 7/2003
JP 2003 530763 10/2003
JP 2004 506947 3/2004

(Continued)

OTHER PUBLICATIONS

Shyh-shiaw Kuo, et al., "Covert Audio Watermarking Using Perceptually Tuned Signal Independent Multiband Phase Modulation", IEEE, International Conference on Acoustics, Speech, and Signal Processing Proceedings, vol. 2, XP 010804233, May 13, 2002, pp. II-1753 to II-1756.

(Continued)

*Primary Examiner* — Joseph Saunders, Jr.
(74) *Attorney, Agent, or Firm* — Oblon, Spivak, McClelland, Maier & Neustadt, L.L.P.

(57) ABSTRACT

A data embedding device has: a phase adjusting unit for adjusting a phase of an acoustic signal in accordance with a frame unit in which arbitrary transmission data is to be embedded; and a combining unit for embedding the transmission data in the phase-adjusted acoustic signal. A data extraction device has: a removing unit for removing a low frequency component from an acoustic signal in which arbitrary transmission data is embedded, to generate a low-frequency-removed acoustic signal; a synchronizing unit for synchronizing the low-frequency-removed acoustic signal generated by the removing unit, in accordance with a frame unit used when the transmission data was embedded in the acoustic data; and an extraction unit for extracting the transmission data from the low-frequency-removed acoustic signal synchronized by the synchronizing unit.

4 Claims, 11 Drawing Sheets

FOREIGN PATENT DOCUMENTS

| | | | |
|---|---|---|---|
| JP | 2004 341066 | | 12/2004 |
| WO | 00 57399 | | 9/2000 |
| WO | WO 00/57399 | | 9/2000 |
| WO | 02 45286 | | 6/2002 |
| WO | WO 0245286 | A2 * | 6/2002 |

OTHER PUBLICATIONS

Nedeljko Cvejic, et al., "Robust Audio Watermarking in Wavelet Domain Using Frequency Hopping and Patchwork Method", Proceedings of the 3rd International Symposium on Image and Signal Processing and Analysis, vol. 1, XP 010704194, Sep. 18, 2003, pp. 251 to 255.

Japanese Office Action issued Feb. 15, 2011, in Patent Application No. 2005-202130 (with English-language translation).

Gruhl, Daniel et al., "Echo Hiding", Information Hiding Workshop, Cambridge, England, 1996.

Boney, Laurence et al., "Digital Watermarks for Audio Signals", IEEE International Conference on Multimedia Computing and Systems, pp. 1 to 8, 1996.

* cited by examiner

DATA EMBEDDING DEVICE, DATA EMBEDDING METHOD, DATA EXTRACTION DEVICE, AND DATA EXTRACTION METHOD

TECHNICAL FIELD

The present invention relates to a data embedding device and data embedding method for embedding arbitrary transmission data in an acoustic signal, and relates to a data extraction device and data extraction method for extracting arbitrary transmission data embedded in an acoustic signal, from the acoustic signal.

BACKGROUND ART

There is the conventionally known digital watermarking technology of embedding transmission data, e.g., copyright information in an acoustic signal, e.g., music or voice, with little effect on its acoustic quality (for example, reference should be made to Non-patent Document 1 or 2 below).

A variety of techniques are known as this digital watermarking technology and, for instance, Non-patent Document 1 describes the digital watermarking technique making use of such a human auditory characteristic that it is hard for a man to perceive a short echo component (reflected sound). Another known technique is the digital watermarking technique making use of such a human auditory characteristic that the human auditory sense is relatively imperceptive to change in phase.

The above-described digital watermarking techniques making use of the human auditory characteristics are effective in cases where the transmission data is embedded in the acoustic signal and where the signal is transmitted through a wire communication line. It is, however, difficult to apply the foregoing digital watermarking techniques to cases where the acoustic signal with the transmission data embedded therein is propagated through the air, for example, from a speaker to a microphone. It is because the echo component and phase in the foregoing digital watermarking techniques undergo various changes depending upon the mechanical characteristics of each of the speaker and the microphone and the aerial propagation characteristics.

On the other hand, a known digital watermarking technique effective to aerial propagation of the acoustic signal is a system using the spread spectrum as described in Non-patent Document 2 and Patent Document 1. In this system using the spread spectrum, the transmission data multiplied by a predetermined spread code sequence is embedded in the acoustic signal and the signal is transmitted to a receiver.

"Non-patent document 1" is "Echo Hiding" in Information Hiding, by D. Gruhl, A. Lu and W. Bender, pp. 295-315, 1996.

"Non-patent document 2" is "Digital watermarks for audio signals" by L. Boney, A. H. Tewfik and K. N. Hamdy, IEEE Intl. Conf. on Multimedia Computing and Systems, pp. 473-480, 1996.

"Patent document 1" is International Publication Number WO 02/45286.

DISCLOSURE OF THE INVENTION

Problem to be Solved by the Invention

In this system using the spread spectrum, however, it becomes difficult to extract the embedded transmission signal from the received acoustic signal, for example, when the correlation is strong between the acoustic signal and the spread code sequence. This results in increasing error in signal discrimination on the occasion of decoding the transmission signal transmitted as embedded.

The present invention has been accomplished in view of the above-described circumstances and an object of the invention is to provide a data embedding device and data embedding method capable of adequately embedding arbitrary transmission data in an acoustic signal, and a data extraction device and data extraction method capable of adequately extracting arbitrary transmission data embedded in an acoustic signal.

Means for Solving the Problem

In order to solve the above problem, a data embedding device according to the present invention comprises phase adjusting means for adjusting a phase of an acoustic signal in accordance with a frame unit in which arbitrary transmission data is to be embedded; and embedding means for embedding the transmission data in the acoustic signal the phase of which has been adjusted by the phase adjusting means.

A data embedding method according to the present invention comprises a phase adjusting step wherein phase adjusting means adjusts a phase of an acoustic signal in accordance with a frame unit in which arbitrary transmission is to be embedded; and an embedding step wherein embedding means embeds the transmission data in the acoustic data the phase of which has been adjusted in the phase adjusting step.

A data extraction device according to the present invention comprises first removing means for removing a low frequency component from an acoustic signal in which arbitrary transmission data is embedded, to generate a first low-frequency-removed acoustic signal; first synchronizing means for synchronizing the first low-frequency-removed acoustic signal generated by the first removing means, in accordance with a frame unit used when the transmission data was embedded in the acoustic signal; and first extraction means for extracting the transmission data from the first low-frequency-removed acoustic signal synchronized by the first synchronizing means.

Another data extraction device according to the present invention comprises second synchronizing means for synchronizing an acoustic signal in accordance with a frame unit used when arbitrary transmission data was embedded in the acoustic signal; second removing means for removing a low frequency component from the acoustic signal synchronized by the second synchronizing means, to generate a second low-frequency-removed acoustic signal; and second extraction means for extracting the transmission data from the second low-frequency-removed acoustic signal generated by the second removing means.

A data extraction method according to the present invention comprises a first removing step wherein first removing means removes a low frequency component from an acoustic signal in which arbitrary transmission data is embedded, to generate a first low-frequency-removed acoustic signal; a first synchronizing step wherein first synchronizing means synchronizes the first low-frequency-removed acoustic signal generated in the first removing step, in accordance with a frame unit used when the transmission data was embedded in the acoustic signal; and a first extraction step wherein first extraction means extracts the transmission data from the first low-frequency-removed acoustic signal synchronized in the first synchronizing step.

Another data extraction method comprises a second synchronizing step wherein second synchronizing means synchronizes an acoustic signal in accordance with a frame unit used when arbitrary transmission data was embedded in the acoustic signal; a second removing step wherein second removing means removes a low frequency component from the acoustic signal synchronized in the second synchronizing step, to generate a second low-frequency-removed acoustic signal; and a second extraction step wherein second extraction means extracts the transmission data from the second low-frequency-removed acoustic signal generated in the second removing step.

According to the data embedding device, data embedding method, data extraction devices, and data extraction methods of the present invention, the data embedding device as a transmitter of the transmission data adjusts the phase of the acoustic signal in accordance with the frame unit in which the transmission data is to be embedded, and then embeds the transmission data in the acoustic signal, in order to facilitate the extraction of the transmission data by the data extraction device as a receiver of the transmission data. The data extraction device extracts the transmission data after completion of frame synchronization in accordance with the frame unit with which the phase of the received acoustic signal was adjusted. This makes it easier for the data extraction device to extract the transmission data embedded by the data embedding device, and it becomes feasible to reduce the discrimination error for the extracted transmission data.

Furthermore, the first removing means removes the low frequency component from the acoustic signal received by the data extraction device. A phase shift of the low frequency component significantly affects the human auditory sense, and the phase adjustment is less effective thereto. For this reason, the operation of preliminarily removing the low frequency component and then performing the subsequent processing enables adequate extraction of the transmission data, without influence on the acoustic quality of acoustic data.

After the acoustic signal is synchronized by the second synchronizing means, the low frequency component is removed from the acoustic signal. As all the frequency components including the low frequency component of the acoustic signal are used on the occasion of the synchronization by the second synchronizing means, it becomes easier to detect a lead point of the synchronization and it is feasible to reduce detection error of the synchronization point.

The data embedding device of the present invention may be configured as follows: the data embedding device comprises dividing means for dividing the acoustic signal into a plurality of subband signals; the phase adjusting means adjusts phases of the subband signals made by the dividing means, in accordance with the frame unit; the data embedding device comprises reconfiguring means for reconfiguring the subband signals the phases of which have been adjusted by the phase adjusting means, into one acoustic signal; and the embedding means embeds the transmission data in the one acoustic signal made by the reconfiguring means. This configuration permits the device to perform fine phase adjustment for each subband signal, which can enhance the effect of the phase adjustment by the phase adjusting means in the present invention.

The data embedding device of the present invention may be configured as follows: the phase adjusting means shifts a time sequence of the acoustic signal by a predetermined sampling time. When the time sequence of the acoustic signal is shifted forward or backward by some sampling time, it becomes easy to perform the phase adjustment for the acoustic signal.

The data embedding device of the present invention may be configured as follows: the phase adjusting means converts the acoustic signal into a frequency domain signal and adjusts a phase of the frequency domain signal. When the acoustic signal is converted into the frequency domain in this manner and the real term and the imaginary term of each frequency spectrum are manipulated, it becomes easy to perform the phase adjustment for the acoustic signal.

The data embedding device of the present invention may comprise smoothing means for combining the acoustic signal before adjustment of the phase with a phase-adjusted acoustic signal after adjustment of the phase by the phase adjusting means, in a part as a border between a predetermined frame of the acoustic signal and another frame adjacent thereto in terms of time. When in the frame border part the non-phase-adjusted acoustic signal and the phase-adjusted acoustic signal are multiplied by their respective fixed ratios and the results are then combined, it becomes feasible to remove noise produced on the occasion of the phase adjustment.

Effect of the Invention

The present invention enables the adequate embedding of arbitrary transmission data in the acoustic signal and the adequate extraction of arbitrary transmission data embedded in the acoustic signal.

DESCRIPTION OF REFERENCE SYMBOLS

1, 2 are for data embedding-extraction system; 100,200 are for data embedding device; 101, 201 are for embedding device; 102, 203 are for phase adjusting unit; 103, 205 are for smoothing unit; 104, 206 are for filter unit; 105, 207 are for combining unit; 106, 208 are for speaker; 110, 210 are for data extraction device; 111, 211 are for microphone; 112, 212 are for extraction device; 113, 214 are for removing unit; 114, 213 are for synchronizing unit; 115, 215 are for extraction unit; 116, 216 are for error correcting unit; 202 is for dividing unit; 204 is for reconfiguring unit.

BEST MODE FOR CARRYING OUT THE INVENTION

The expertise of the present invention can be readily understood in view of the following detailed description with reference to the accompanying drawings presented by way of illustration only. Subsequently, embodiments of the present invention will be described with reference to the accompanying drawings. The same portions will be denoted by the same reference symbols as much as possible, without redundant description.

First Embodiment

Figure 1:
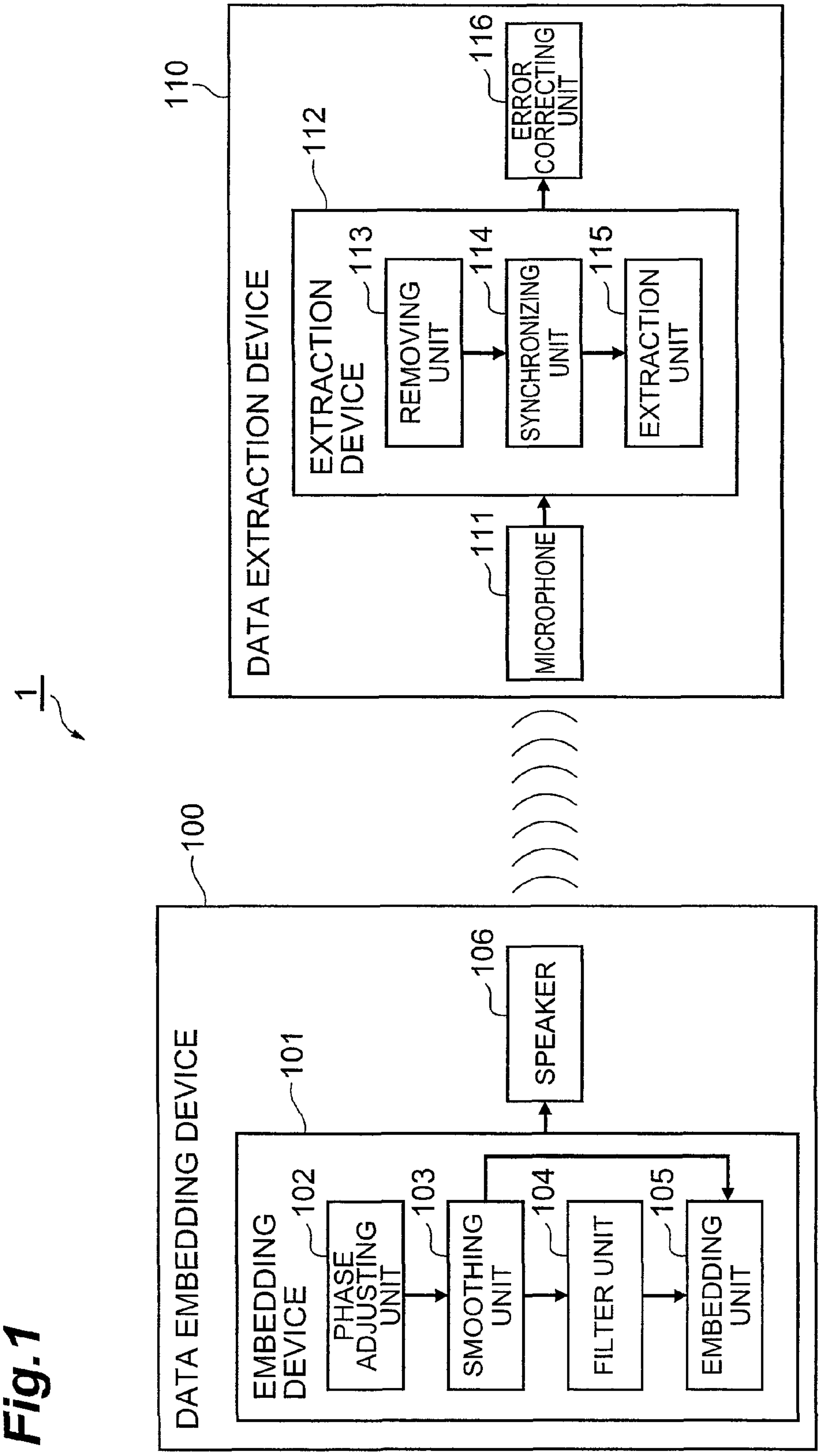
FIG. 1 is a schematic configuration diagram of data embedding-extraction system 1.

A data embedding-extraction system 1 in the first embodiment of the present invention will be described below. FIG. 1 is a schematic configuration diagram of the data embedding-extraction system 1. As shown in FIG. 1, the data embedding-extraction system 1 is comprised of data embedding device 100 and data extraction device 110. The data embedding device 100 is a device for embedding arbitrary transmission data, for example, in an acoustic signal such as music, and, for example, copyright information or the like is embedded as watermark data in the acoustic signal. The data extraction device 110 is a device for extracting the transmission data embedded in the acoustic signal. Each of the components constituting the data embedding-extraction system 1 will be described below in detail.

The data embedding device 100, as shown in FIG. 1, is comprised of embedding device 101 and speaker 106. The embedding device 101 is a device for embedding the transmission data in the acoustic signal and is comprised of phase adjusting unit 102 (phase adjusting means), smoothing unit 103 (smoothing means), filter unit 104, and combining unit 105 (embedding means). The speaker 106 is a device for propagating a synthesized acoustic signal with the transmission data therein through the air toward the data extraction device 110. This speaker 106 is, for example, an ordinary acoustic signal output device as one capable of generating the vibrational frequencies of approximately 20 Hz to 20 kHz being the human audible frequency region. Each of the components constituting this data embedding device 100 will be described below in detail with reference to FIGS. 2 to 5.

Figure 2:
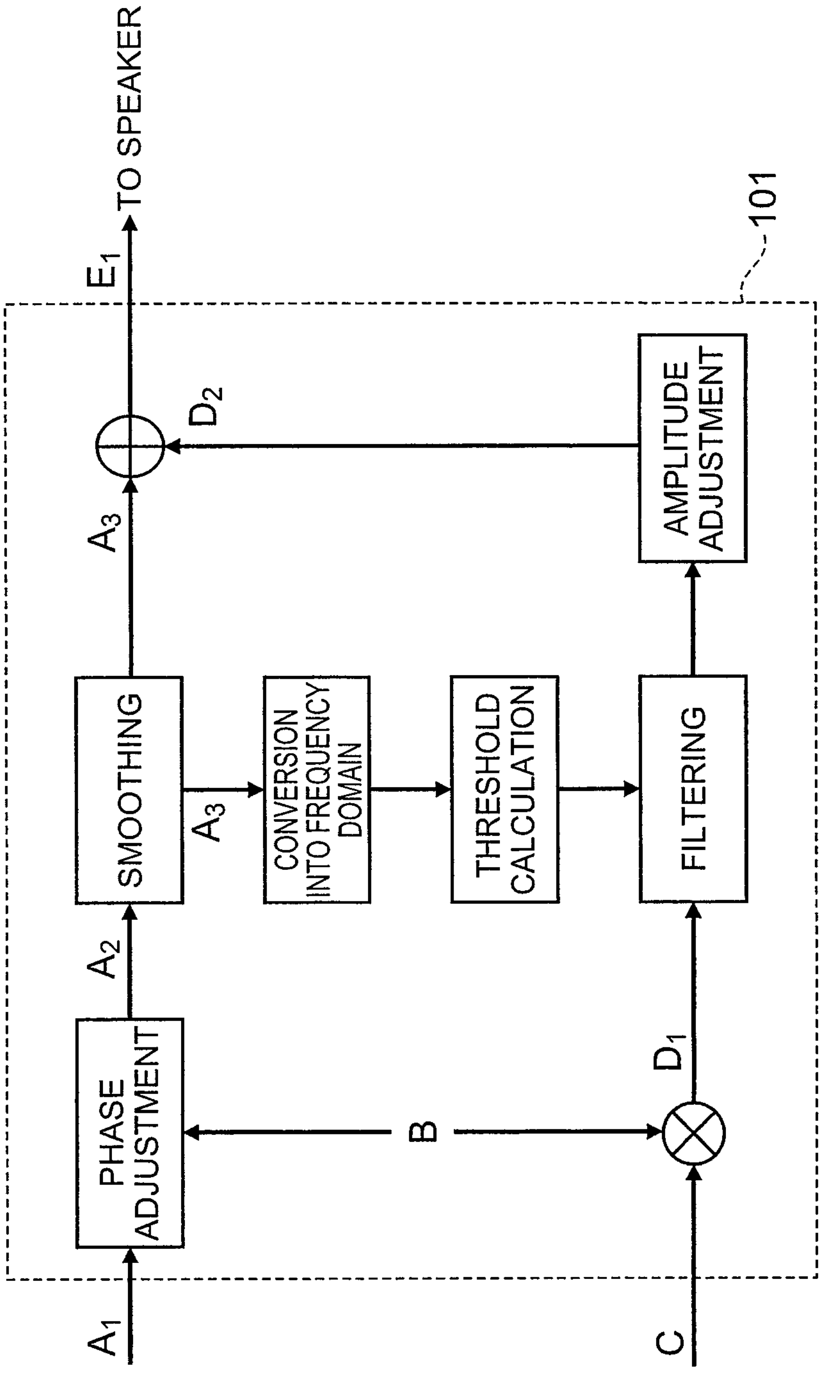
FIG. 2 is a block diagram for explaining an operation of embedding device 101.

FIG. 2 is a block diagram for explaining the operation of the embedding device 101. First, an acoustic signal $A_1$ is fed in a predetermined frame unit into the phase adjusting unit 102. This predetermined frame unit is a unit preliminarily appropriately set between the data embedding device 100 and the data extraction device 110, and frame unit used later when the combining unit 105 embeds the transmission data C in the acoustic data $A_1$. The phase adjusting unit 102 performs phase adjustment for a time sequence signal of the input frame.

More specifically, the phase adjusting unit 102 converts the time sequence signal of the input frame into a spectral sequence in the frequency domain by Fourier transform. Then the phase adjusting unit 102 calculates a correlation value between acoustic signal $A_1$ and spread code sequence B, while varying the ratio of real term and imaginary term of the coefficient of each spectrum little by little. This spread code sequence B is one preliminarily appropriately set in order to spread the transmission data C. When the data bit of the transmission data C to be embedded is 0, the phase adjusting unit 102 adjusts the phase of the acoustic signal $A_1$ so as to make the correlation value strong in the plus direction at the lead point of the frame. When the data bit of the transmission data C to be embedded is 1, the phase adjusting unit 102 adjusts the phase of the acoustic signal $A_1$ so as to make the correlation value strong in the minus direction at the lead point of the frame.

A phase-adjusted acoustic signal $A_2$ generated with the phase adjustment in the frame unit as described above is a signal whose phase is discontinuous with respect to the adjacent preceding and subsequent frames. For this reason, the smoothing unit 103 smooths the discontinuity of phase in the border parts of the frame to reduce noise due to the phase discontinuity. More specifically, the smoothing unit 103 multiplies the acoustic signal $A_1$ without the phase adjustment and the phase-adjusted acoustic signal $A_2$ with the phase adjustment by respective fixed ratios, near the border parts of the frame, and combines the results to generate a smoothed signal $A_3$.

For example, in a case where the smoothing is performed for zones of 100 samples in the front part and the rear part of the frame, a smoothed signal $A_{3i}$ of the ith sample from the head of the frame is generated by multiplying the acoustic signal $A_{1i}$ without phase adjustment by (100−i)/100 and multiplying the phase-adjusted acoustic signal $A_{2i}$ with phase adjustment by i/100 and combining the results. The same method is also applied to generation of a smoothed signal $A_3$ of the ith sample from the tail end of the frame. The smoothing unit 103 outputs the generated smoothed signal $A_3$ to the filter unit 104 and to the combining unit 105.

Figure 3:
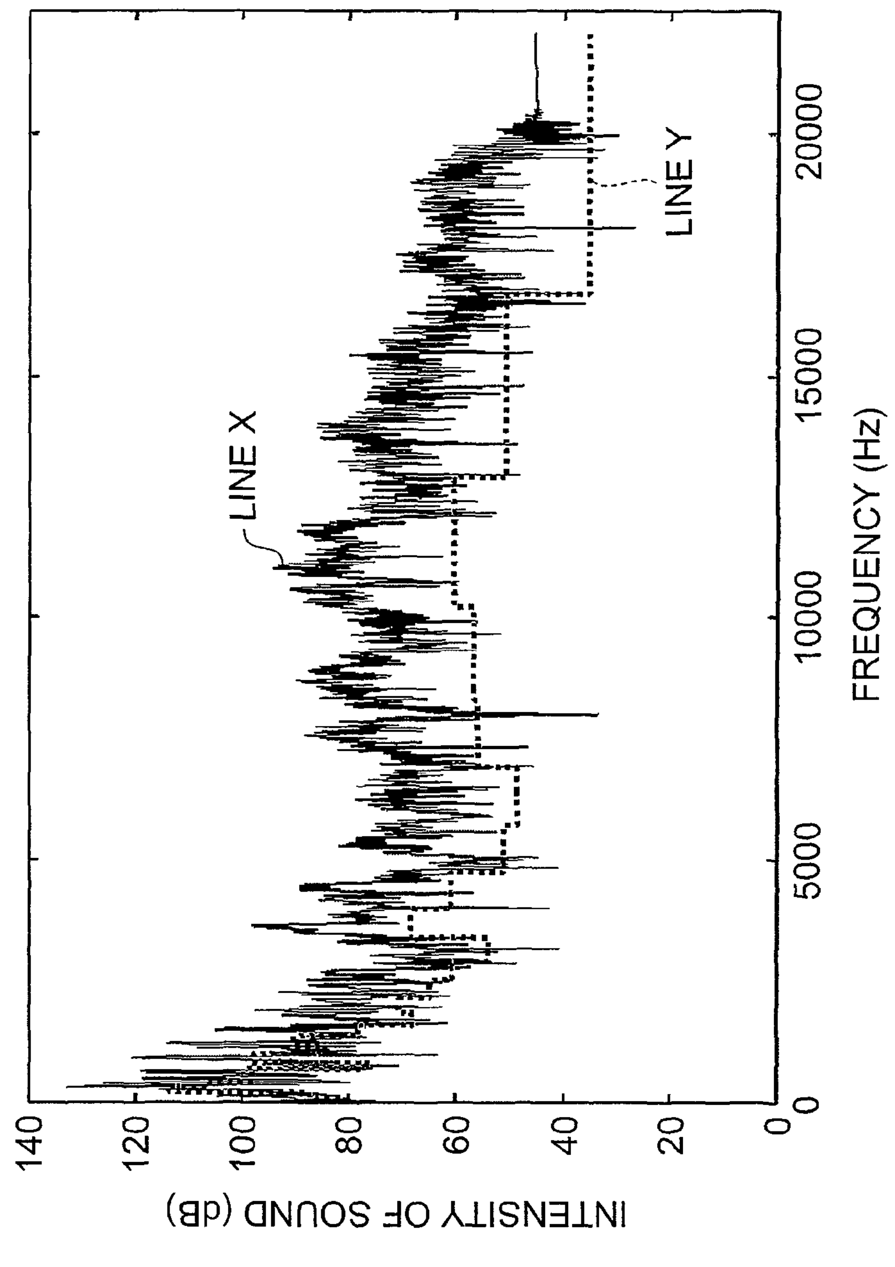
FIG. 3 is a chart showing a frequency spectrum of acoustic signal $A_1$ and frequency masking thresholds.

The filter unit 104 converts the smoothed signal $A_3$ generated by the smoothing unit 103, in the same frame unit into the frequency domain by FFT (fast Fourier transform) to calculate frequency masking thresholds. The well-known psycho-acoustic model is used for the calculation of the frequency masking thresholds at this time. FIG. 3 shows the frequency masking thresholds calculated by this psycho-acoustic model. In FIG. 3, line X indicated by a solid line represents a frequency spectrum of the acoustic signal $A_1$, and line Y indicated by a dotted line represents the frequency masking thresholds. The filter unit 104 forms a frequency masking filter by inverse Fourier transform of a frequency response of linear phase with the same frequency characteristics as the frequency masking thresholds, based on the calculated frequency masking thresholds.

The filter unit 104 receives an input of spread signal $D_1$ resulting from an operation of multiplying the transmission data C by the spread code sequence B to spread the data in the entire frequency band. Then the filter unit 104 subjects the spread signal $D_1$ to the frequency masking filter and performs amplitude adjustment for the result of the filtering within the scope not exceeding the mask thresholds, to generate a frequency-weighted spread signal $D_2$ in which frequency spectra are weighted based on the frequency masking thresholds. Then the filter unit 104 outputs the generated frequency-weighted spread signal $D_2$ to the combining unit 105.

The combining unit 105 combines the frequency-weighted spread signal $D_2$ fed from the filter unit 104, with the smoothed signal $A_3$ fed from the smoothing unit 103, to generate a synthesized acoustic signal $E_1$. Then the combining unit 105 outputs the generated synthesized acoustic signal $E_1$ to the speaker 106, and the speaker 106 propagates the synthesized acoustic signal $E_1$ through the air toward the data extraction device 110 as a receiver.

Figure 4:
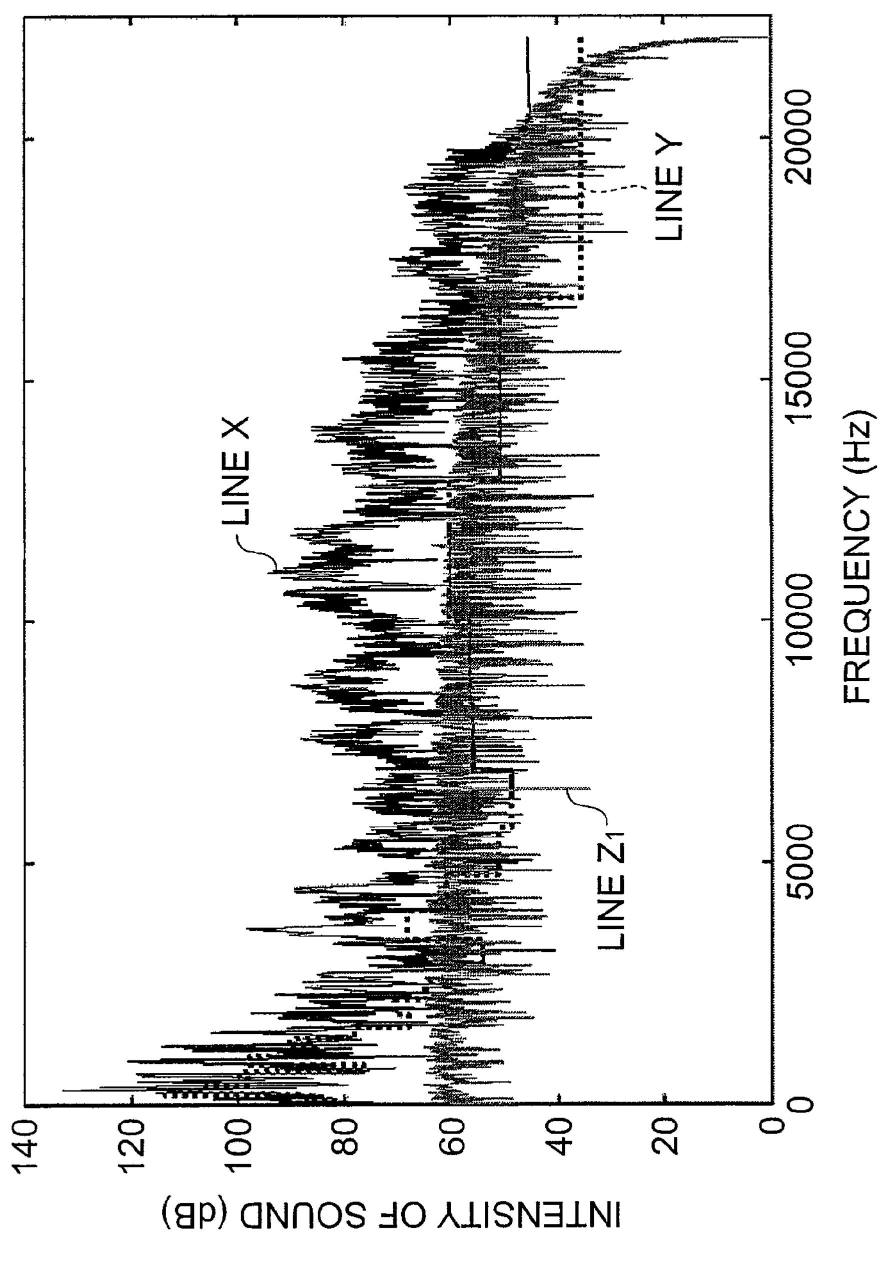
FIG. 4 is a chart showing a frequency spectrum of acoustic signal $A_1$, frequency masking thresholds, and a frequency spectrum of spread signal $D_1$.

FIG. 4 shows the frequency spectrum of the spread signal $D_1$ (indicated by line $Z_1$) in addition to the frequency spectrum of the acoustic signal $A_1$ (indicated by line X) and the frequency masking thresholds (indicated by line Y) shown in FIG. 3. In order to discriminate line X from line $Z_1$, line X is indicated by a thin solid line and line $Z_1$, by a thick solid line in FIG. 4. In this FIG. 4, the frequency spectrum of the spread signal $D_1$ is considerably lower than the masking thresholds in the low frequency part, while it exceeds the masking thresholds in the high frequency part; therefore, the gain of the spread signal $D_1$ is not efficient and noise will be perceived.

Figure 5:
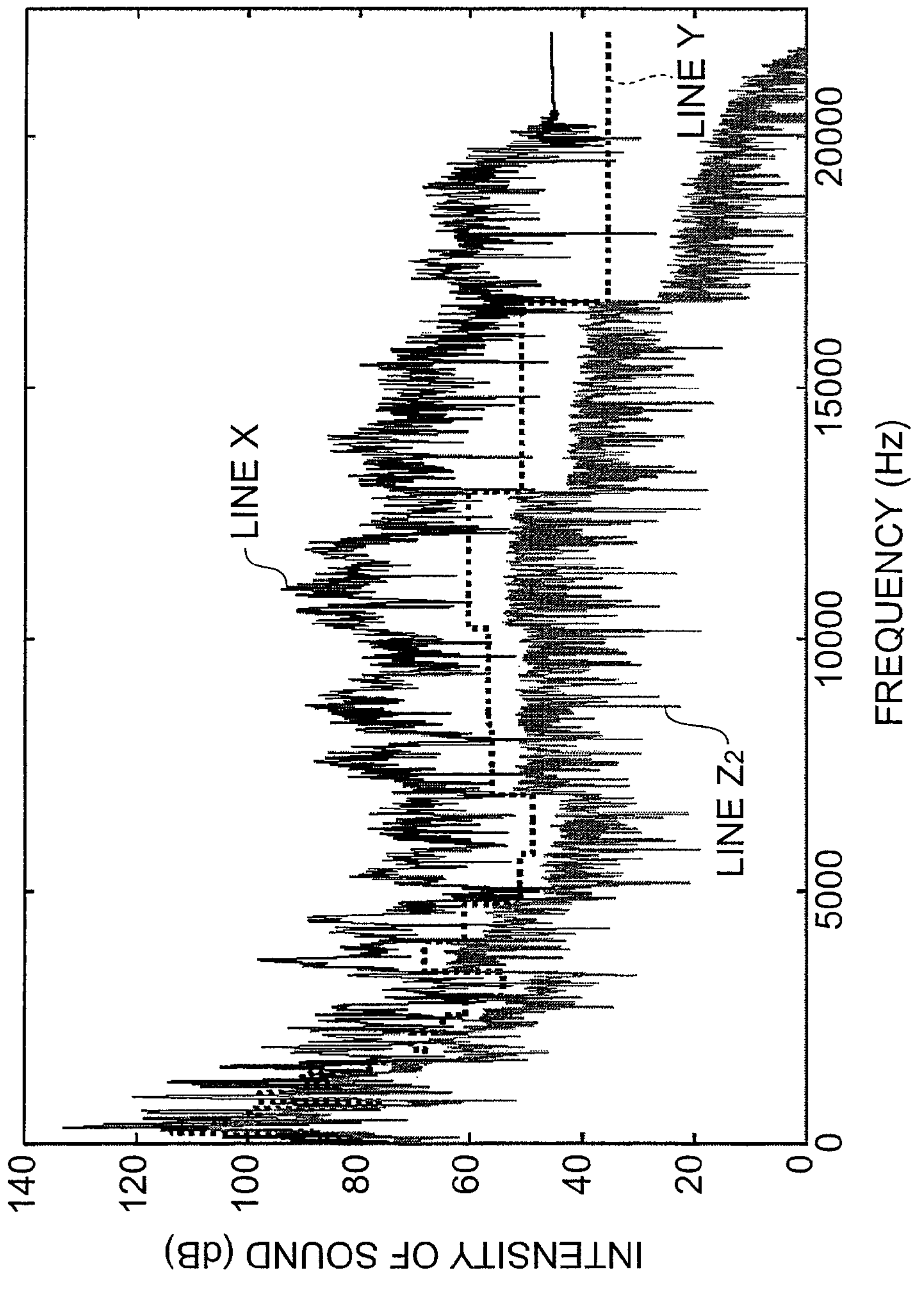
FIG. 5 is a chart showing a frequency spectrum of acoustic signal $A_1$, frequency masking thresholds, and a frequency spectrum of frequency-weighted spread signal $D_2$.

On the other hand, FIG. 5 shows the frequency spectrum of the frequency-weighted spread signal $D_2$ (indicated by line $Z_2$) in addition to the frequency spectrum of the acoustic signal $A_1$ (indicated by line X) and the frequency masking thresholds (indicated by line Y) shown in FIG. 3. In order to discriminate line X from line $Z_2$, line X is indicated by a thin solid line and line $Z_2$ by a thick solid line in FIG. 5. Such weighting for the spread signal $D_1$ permits the transmission data C (spread signal $D_2$) to be embedded up to the masking threshold limits.

Referring back to FIG. 1, the data extraction device 110 is comprised of microphone 111, extraction device 112, and error correcting unit 116. The microphone 111 is a unit for receiving the synthesized acoustic signal $E_1$ having been propagated through the air from the speaker 106 of the data embedding device 100, and an ordinary acoustic signal acquiring device is used as the microphone 111. The extraction device 112 is a device for extracting the transmission data $C_0$ embedded in the synthesized acoustic signal $E_1$ received by the microphone 111, and is comprised of removing unit 113 (first removing means), synchronizing unit 114 (first synchronizing means), and extraction unit 115 (first extraction means). The error correcting unit 116 is a unit for correcting error to recover the original transmission data C from the extracted transmission data $C_0$. Each of the components constituting this data extraction device 110 will be described below in detail with reference to FIG. 6.

Figure 6:
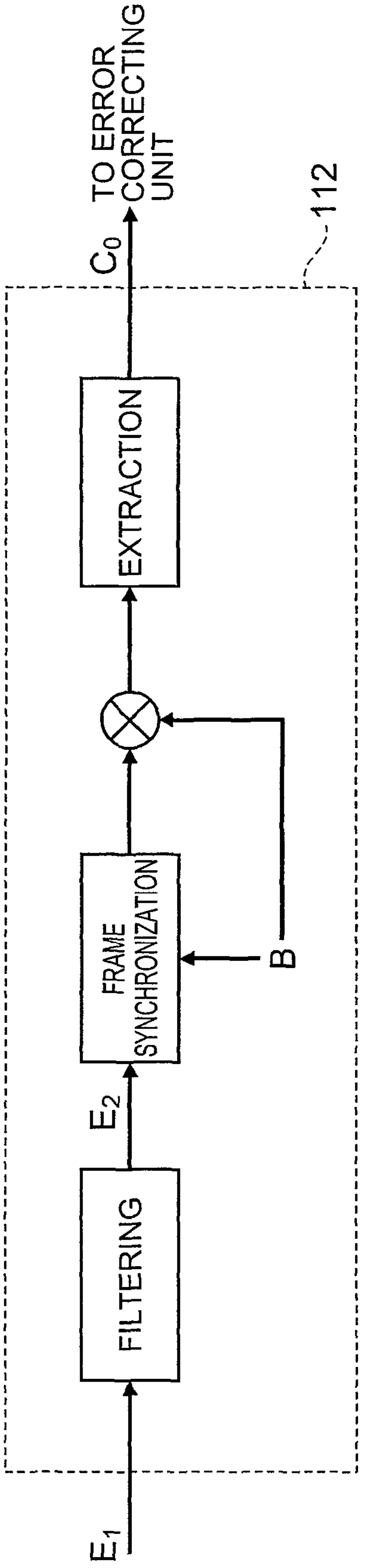
FIG. 6 is a block diagram for explaining an operation of extraction device 112.

FIG. 6 is a block diagram for explaining the operation of this extraction device 112. First, the removing unit 113 receives the input synthesized acoustic signal $E_1$ received from the speaker 106 of the data embedding device 100 by the microphone 111. The removing unit 113 is composed of a so-called high-pass filter and is a unit for removing low frequency components from the input synthesized acoustic signal $E_1$ to generate a low-frequency-removed acoustic signal (first low-frequency-removed acoustic signal) $E_2$. As the removing unit 113 preliminarily removes the low frequency components with strong correlation with the spread code sequence B in this manner, a discrimination error rate is reduced for the transmission data C. The removing unit 113 outputs the generated low-frequency-removed acoustic signal $E_2$ to the synchronizing unit 114. The removing unit 113 in the first embodiment is composed of a digital filter that performs A/D conversion of the synthesized acoustic signal $E_1$ received by the microphone 111 and that filters a signal resulting from the A/D conversion.

The synchronizing unit 114 receives the input low-frequency-removed acoustic signal $E_2$ from the removing unit 113 and synchronizes the low-frequency-removed acoustic signal $E_2$ in accordance with the frame unit used when the data embedding device 100 embedded the transmission data C in the acoustic data $A_1$. More specifically, the synchronizing unit 114 calculates a correlation value between the input low-frequency-removed acoustic signal $E_2$ and the spread code sequence B while shifting the signal by several samples each time, and detects a point with the highest correlation value as a lead point (synchronization point) of the frame. The synchronizing unit 114 outputs the low-frequency-removed acoustic signal $E_2$ with the synchronization point thus detected, to the extraction unit 115.

The extraction unit 115 divides the low-frequency-removed acoustic signal $E_2$ into frames on the basis of the synchronization points detected by the synchronizing unit 114. Then the extraction unit 115 multiplies each divided frame by the spread code sequence B and extracts the transmission data $C_0$ on the basis of the calculated correlation value. More specifically, the extraction unit 115 identifies 0 as the transmission data $C_0$ if the calculated correlation value is plus; the extraction unit 115 identifies 1 as the transmission data $C_0$ if the calculated correlation value is minus. The extraction unit 115 outputs the identified transmission data $C_0$ to the error correcting unit 116 and the error correcting unit 116 corrects error to recover the original transmission data C from the input transmission data $C_0$.

Figure 7:
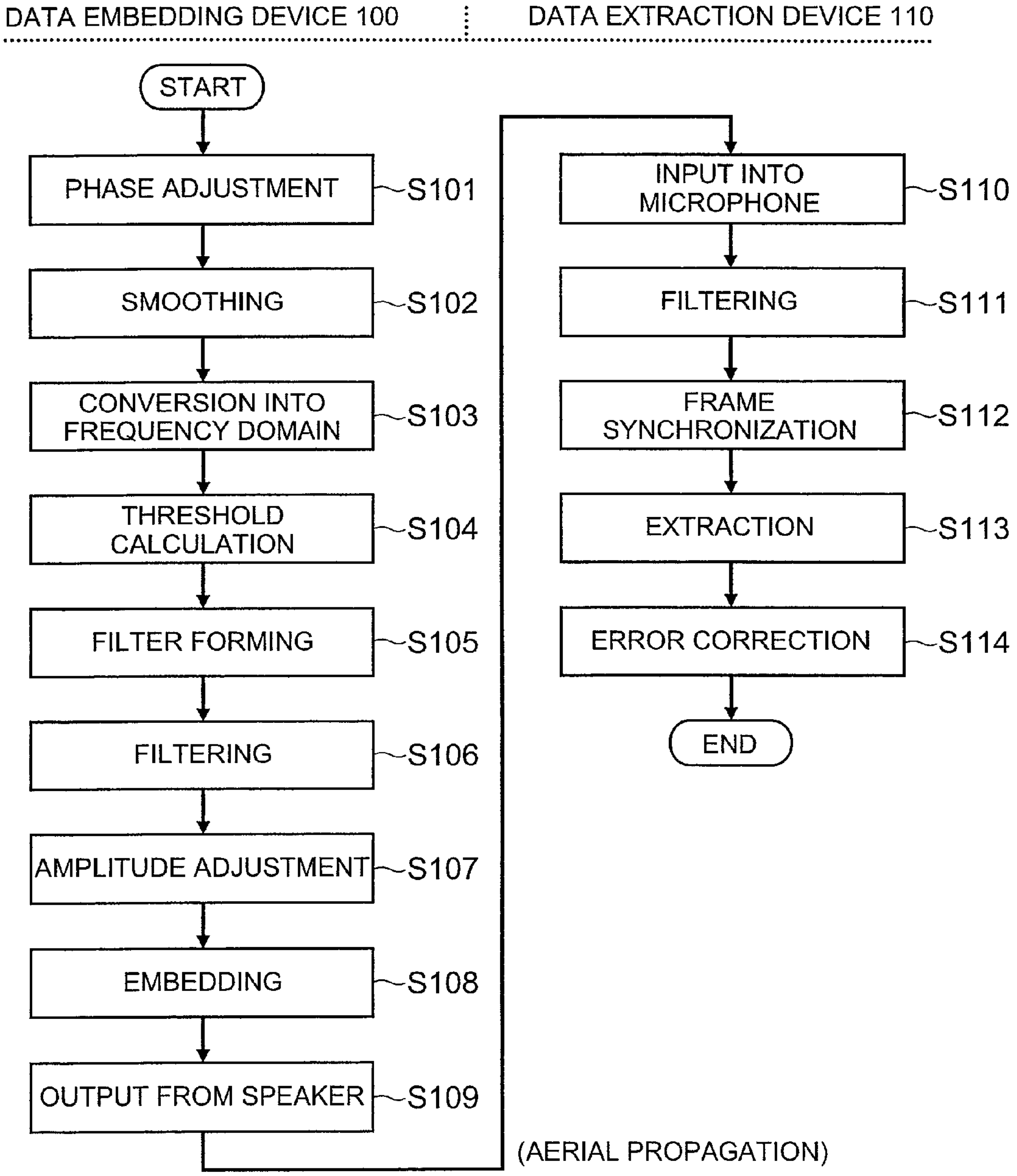
FIG. 7 is a flowchart for explaining operations of data embedding device 100 and data extraction device 110.

Subsequently, the control flow of the data embedding-extraction system 1 in the first embodiment will be described with reference to FIG. 7. FIG. 7 is a flowchart for explaining the operations in which the data embedding device 100 embeds the transmission data C in the acoustic data $A_1$ and in which the data extraction device 110 recovers the transmission data C.

First, the acoustic signal $A_1$ is fed in the predetermined frame unit to the phase adjusting unit 102 and the phase adjusting unit 102 adjusts the phase of the time sequence signal of the input frame (step S101). Next, the smoothing unit 103 smooths the phase-adjusted acoustic signal $A_2$ obtained by the phase adjustment in step S101 (step S102).

Next, the smoothed signal $A_3$ obtained by the smoothing in step S102 is converted into the frequency domain and the frequency masking thresholds are calculated (step S103 and step S104). The frequency masking filter is formed based on the frequency masking thresholds calculated in step S104 (step S105).

Subsequently, the spread signal $D_1$, which results from the operation in which the transmission data C is multiplied by the spread code sequence B to be spread into the entire frequency band, is fed to the frequency masking filter formed in step S105, to be filtered (step S106). Then the amplitude is adjusted for the result of the filtering in step S106 within the scope not exceeding the masking thresholds, to generate the frequency-weighted spread signal $D_2$ (step S107).

The frequency-weighted spread signal $D_2$ generated in step S107 is combined with the smoothed signal $A_3$ generated in step S102 (step S108). Then the synthesized acoustic signal $E_1$ synthesized in step S108 is propagated through the air toward the data extraction device 110 as a receiver by the speaker 106 (step S109).

The synthesized acoustic signal $E_1$ transmitted in step S109 is received by the microphone 111 of the data extraction device 110 (step S110). Next, filtering is performed to remove the low frequency components from the synthesized acoustic signal $E_1$ received in step S110, to generate the low-frequency-removed acoustic signal $E_2$ (step S111).

Subsequently, the low-frequency-removed acoustic signal $E_2$ generated in step S111 is synchronized in accordance with the frame unit used when the transmission data C was embedded in the acoustic data $A_1$ (step S112).

The transmission data $C_0$ is extracted from the low-frequency-removed acoustic signal $E_2$ synchronized in step S112 (step S113). Then the transmission data $C_0$ extracted in step S113 is fed to the error correcting unit 116 to be corrected for discrimination error, whereupon the original transmission data C is recovered (step S114).

The action and effect of the first embodiment will be described below. According to the data embedding-extraction system 1 of the first embodiment, in order to facilitate the extraction of the transmission data C at the data extraction device 110 as a receiver of the transmission data C, the data embedding device 100 as a transmitter of the transmission data C embeds the transmission data C after the adjustment of the phase of the acoustic signal $A_1$ in accordance with the frame unit in which the transmission data C is to be embedded. Then the data extraction device 110 recovers the transmission data C after performing the frame synchronization in accordance with the frame unit used at the time of the phase adjustment of the received synthesized acoustic signal $E_1$. This makes it easier for the data extraction device 110 to extract the transmission data C embedded by the data embedding device 100, and thus makes it feasible to reduce the discrimination error for the extracted transmission data C.

Furthermore, in the first embodiment the removing unit 113 removes the low frequency components from the synthesized acoustic signal $E_1$ received by the data extraction device 110. A phase shift of the low frequency components significantly affects the human auditory sense and the phase adjustment is less effective thereto. For this reason, by performing the subsequent processing after the preliminary removal of the low frequency components, it becomes feasible to appropriately extract the transmission data C, without influence on the auditory quality of the acoustic data $A_1$.

In the first embodiment, the phase adjusting unit 102 is able to readily perform the phase adjustment for the acoustic signal $A_1$, by converting the acoustic signal $A_1$ into the spectral sequence in the frequency domain by Fourier transform and varying the ratio of real term and imaginary term of coefficient of each frequency spectrum.

In the first embodiment the smoothing unit 103 smooths the discontinuity of phase in the border parts of the frame. This can remove the noise caused by the phase discontinuity on the occasion of the phase adjustment.

Second Embodiment

Figure 8:
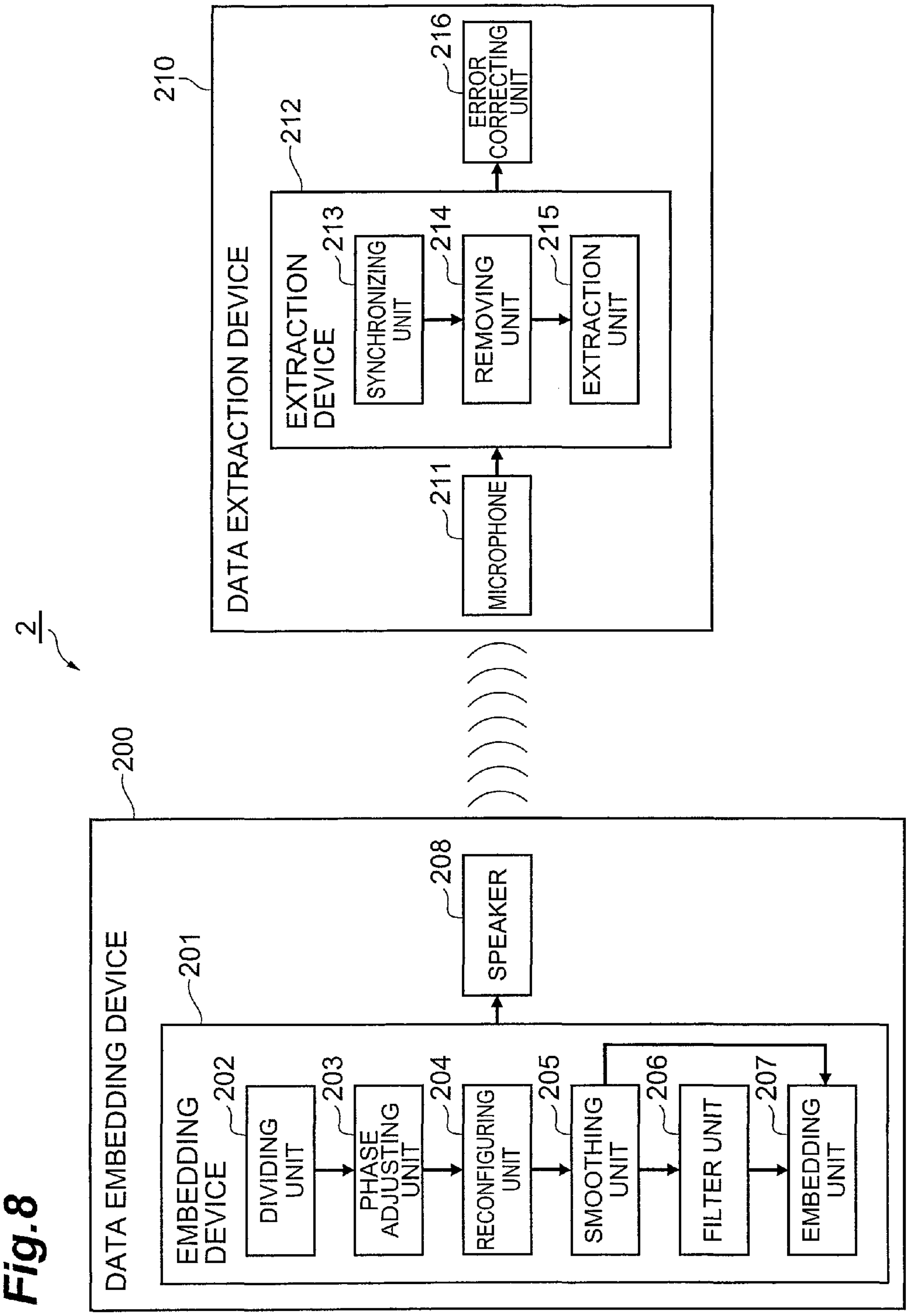
FIG. 8 is a schematic configuration diagram of data embedding-extraction system 2.
Figure 9:
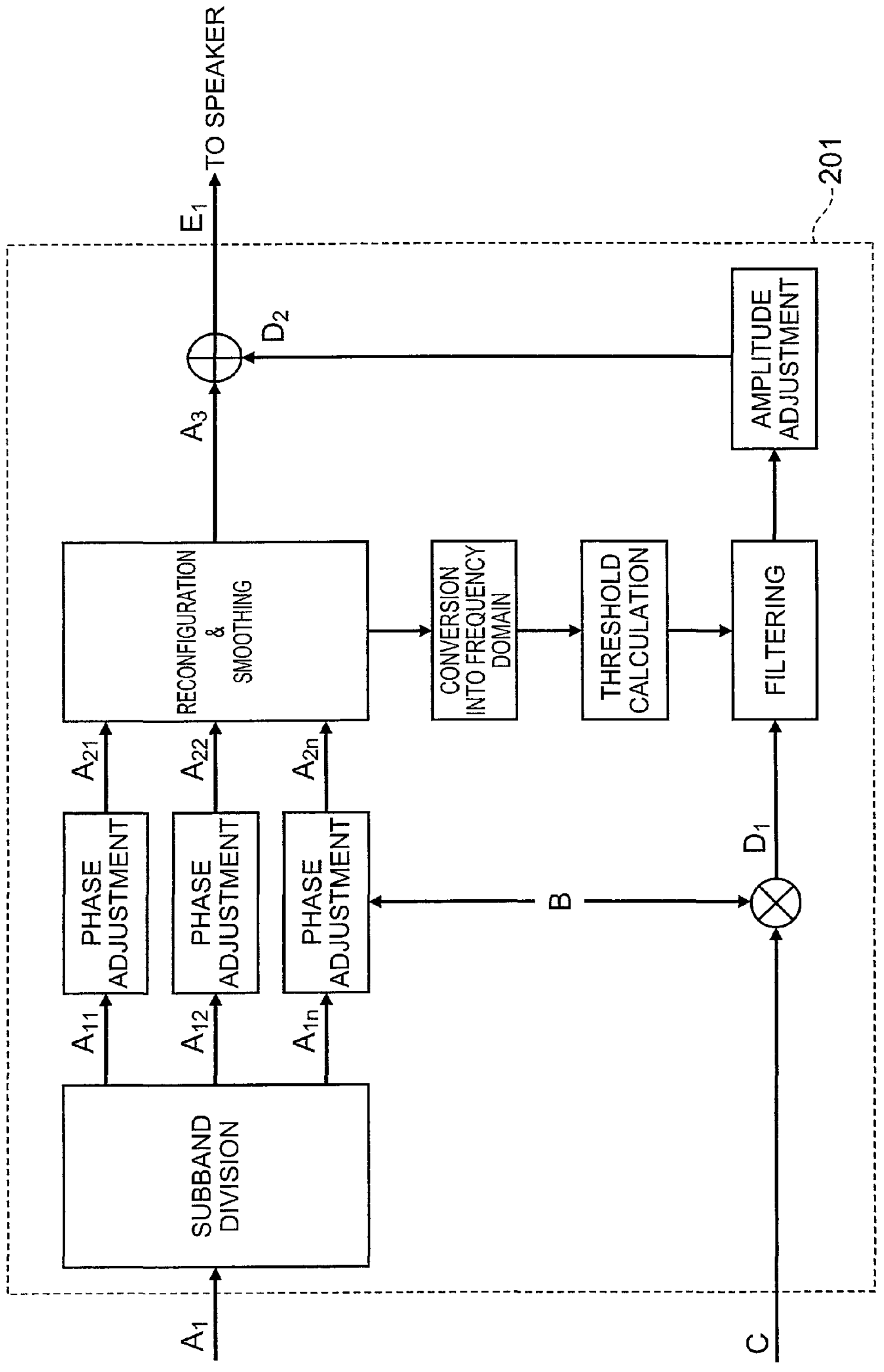
FIG. 9 is a block diagram for explaining an operation of embedding device 201.
Figure 10:
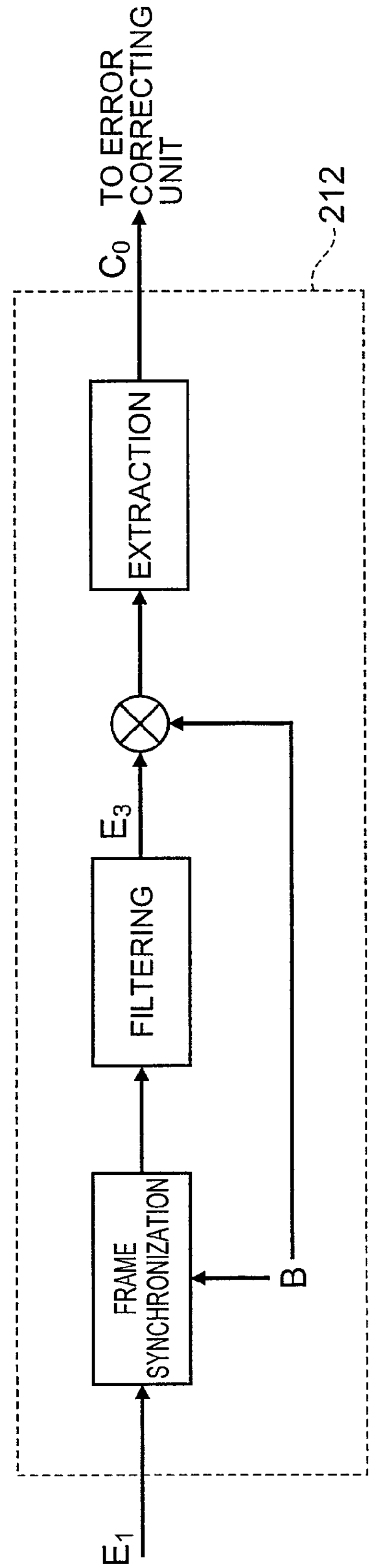
FIG. 10 is a block diagram for explaining an operation of extraction device 212.

A data embedding-extraction system 2 in the second embodiment of the present invention will be described below. FIG. 8 is a schematic configuration diagram of the data embedding-extraction system 2. As shown in FIG. 8, the data embedding-extraction system 2 is comprised of data embedding device 200 and data extraction device 210. Each of the components constituting this data embedding-extraction system 2 will be described below in detail with reference to FIGS. 8 to 10. FIG. 9 is a block diagram for explaining the operation of embedding device 201 in the data embedding device 200. FIG. 10 is a block diagram for explaining the operation of extraction device 212 in the data extraction device 210. The description will be omitted for duplicate portions as already described in the first embodiment.

As shown in FIG. 8, the data embedding device 200 is comprised of embedding device 201 and speaker 208, and the embedding device 201 includes dividing unit 202 (dividing means), phase adjusting unit 203 (phase adjusting means), reconfiguring unit 204 (reconfiguring means), smoothing unit 205 (smoothing means), filter unit 206, and combining unit (embedding means) 207. First, as shown in FIG. 9, an acoustic signal $A_1$ is fed to the dividing unit 202. The dividing unit 202 divides the input acoustic signal $A_1$ into subbands of respective frequency bands to generate subband signals ($A_{11}$, $A_{12}$, . . . , $A_{1n}$). Then the dividing unit 202 outputs the generated subband signals ($A_{11}$, $A_{12}$, . . . , $A_{1n}$) to the phase adjusting unit 203.

The phase adjusting unit 203 independently performs the phase adjustment for each of the subband signals ($A_{11}$, $A_{12}$, . . . , $A_{1n}$) of the respective frequency bands fed from the dividing unit 202. More specifically, the phase adjusting unit 203 calculates a correlation value with the spread code sequence B while providing the subband signals ($A_{11}$, $A_{12}$, . . . , $A_{1n}$) with a delay of several samples, in accordance with the frame unit in which the transmission data C is to be embedded. Then a delay of several samples is given so as to make the correlation value with the spread code sequence B high in the plus direction, to a frame in which the transmission data C is to be embedded so as to make the correlation value high in the plus direction at the synchronization point, i.e., a frame in which the data bit of the transmission data C to be embedded is 0.

Furthermore, a delay of several samples is given so as to make the correlation value with the spread code sequence B high in the minus direction, to a frame in which the transmission data C is to be embedded so as to make the correlation value high in the minus direction at the synchronization point, i.e., a frame in which the data bit of the transmission data C to be embedded is 1. The phase adjusting unit 203 outputs the phase-adjusted subband signals ($A_{21}$, $A_{22}$, . . . , $A_{2n}$) obtained by the phase adjustment, to the reconfiguring unit 204. Since the low-frequency subband signals demonstrate little change in the correlation value even with the delay of several samples, it can be more efficient in certain cases to maintain the phase continuity without the phase adjustment.

The reconfiguring unit 204 receives the input phase-adjusted subband signals ($A_{21}$, $A_{22}$, . . . , $A_{2n}$) from the phase adjusting unit 203 and reconfigures them into one acoustic signal. The reconfiguring unit 204 outputs the one acoustic signal resulting from the reconfiguration, to the smoothing unit 205 and the smoothing unit 205 smooths the discontinuity of phase in the border parts of the frame to reduce the noise due to the phase discontinuity.

Referring back to FIG. 8, the data extraction device 210 is comprised of microphone 211, extraction device 212, and error correcting unit 216, and the extraction device 212 includes synchronizing unit 213 (second synchronizing means), removing unit 214 (second removing means), and extraction unit 215 (second extraction means).

First, as shown in FIG. 10, the synchronizing unit 213 receives the input synthesized acoustic signal $E_1$ received from the speaker of the data embedding device 200 by the microphone 211. The synchronizing unit 213 is a unit for synchronizing the input synthesized acoustic signal $E_1$ in accordance with the frame unit used when the data embedding device 200 embedded the transmission data C in the acoustic data $A_1$. More specifically, the synchronizing unit 213 calculates the correlation value between the input synthesized acoustic signal $E_1$ and the spread code sequence B while shifting the signal by several samples each time and identifies a point with the highest correlation value as a lead point (synchronization point) of the frame. The synchronizing unit 213 outputs the synthesized acoustic signal $E_1$ with the synchronization point thus detected, to the removing unit 214.

The removing unit 214 is composed of a so-called high-pass filter and is a unit for receiving the input synthesized acoustic signal $E_1$ with the synchronization point detected and removes low frequency components therefrom to generate a low-frequency-removed acoustic signal (second low-frequency-removed acoustic signal) $E_3$. The removing unit 214 outputs the generated low-frequency-removed acoustic signal $E_3$ to the extraction unit 215.

The extraction unit 215 divides the low-frequency-removed acoustic signal $E_3$ fed from the removing unit 214, into frames, based on the synchronization points detected by the synchronizing unit 213. Then the extraction unit 215 multiplies each of the divided frames by the spread code sequence B to extract the transmission data $C_0$, based on the calculated correlation value. More specifically, the extraction unit 215 identifies 0 as the transmission data $C_0$ if the calculated correlation value is plus; the extraction unit 215 identifies 1 as the transmission data $C_0$ if the calculated correlation value is minus. The extraction unit 215 outputs the identified transmission data $C_0$ to the error correcting unit 216, and the error correcting unit 216 corrects error to recover the original transmission data C from the input transmission data $C_0$.

Figure 11:
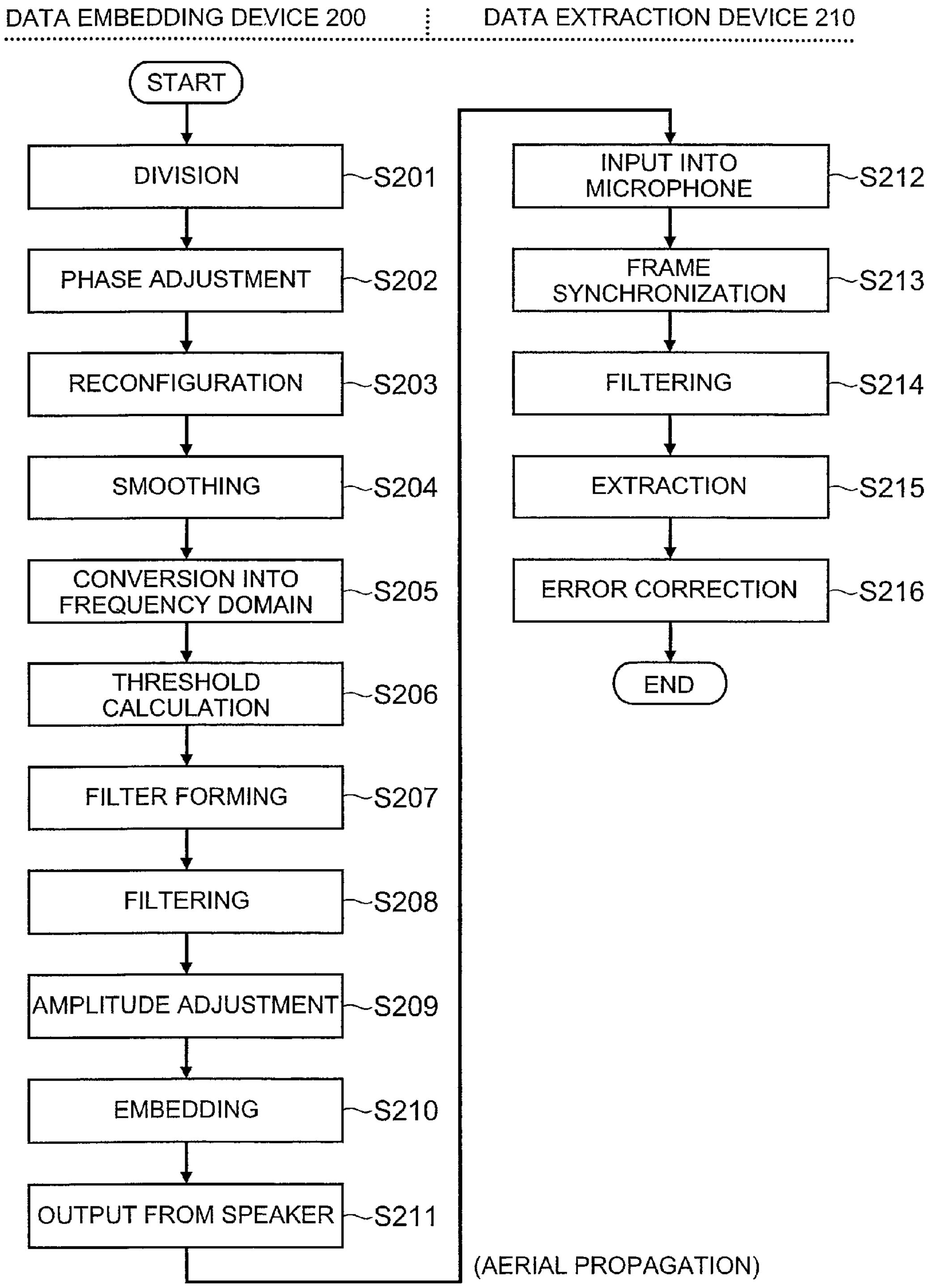
FIG. 11 is a flowchart for explaining operations of data embedding device 200 and data extraction device 210.

Subsequently, the control flow of the data embedding-extraction system 2 in the second embodiment will be described with reference to FIG. 11. FIG. 11 is a flowchart for explaining the operations in which the data embedding device 200 embeds the transmission data C in the acoustic data $A_1$ and in which the data extraction device 210 recovers the transmission data C.

First, an acoustic signal $A_1$ fed to the dividing unit 202 is divided into subbands of respective frequency bands to generate subband signals ($A_{11}, A_{12}, \ldots, A_{1n}$) (step S201). Next, the phase adjustment is performed independently for each of the subband signals ($A_{11}, A_{12}, \ldots, A_{1n}$) generated in step S201 (step S202).

Next, the phase-adjusted subband signals ($A_{21}, A_{22}, \ldots, A_{2n}$) after the independent phase adjustment for each subband in step S202 are reconfigured into one acoustic signal (step S203). Then the smoothing unit 205 performs smoothing for the one acoustic signal resulting from the reconfiguration in step S203 (step S204).

Next, the smoothed signal $A_3$ resulting from the smoothing in step S204 is converted into the frequency domain, and the frequency masking thresholds are calculated (step S205 and step S206). The frequency masking filter is formed based on the frequency masking thresholds calculated in step S206 (step S207).

Subsequently, the spread signal $D_1$, which results from the operation in which the transmission data C is multiplied by the spread code sequence B to be spread in the entire frequency band, is fed to the frequency masking filter formed in step S207, to be filtered (step S208). Then the amplitude adjustment is performed for the result of the filtering in step S208 within the scope not exceeding the masking thresholds, to generate the frequency-weighted spread signal $D_2$ (step S209).

The frequency-weighted spread signal $D_2$ generated in step S209 is combined with the smoothed signal $A_3$ generated in step S204 (step S210). Then the synthesized acoustic signal $E_1$ synthesized in step S210 is propagated through the air toward the data extraction device 210 as a receiver by the speaker (step S211).

The synthesized acoustic signal $E_1$ transmitted in step S211 is received by the microphone 211 of the data extraction device 210 (step S212). Then the synthesized acoustic signal $E_1$ received in step S212 is synchronized in accordance with the frame unit used when the transmission data C was embedded in the acoustic data $A_1$ (step S213). Subsequently, low frequency components are removed from the synthesized acoustic signal $E_1$ synchronized in step S213, by filtering to generate the low-frequency-removed acoustic signal $E_3$ (step S214). Next, the transmission data $C_0$ is extracted from the low-frequency-removed acoustic signal $E_3$ generated in step S214, based on the synchronization point detected in step S213 (step S215). Then the transmission data $C_0$ extracted in step S215 is fed to the error correcting unit 216 and corrected for discrimination error, whereupon the original transmission data C is recovered (step S216).

Subsequently, the action and effect of the second embodiment will be described. According to the data embedding-extraction system 2 of the second embodiment, the input acoustic signal $A_1$ is divided in subbands of respective frequency bands and the phase adjustment is performed independently for each of the divided subband signals ($A_{11}, A_{12}, \ldots, A_{1n}$). Since this enables fine phase adjustment for each subband, the effect of the phase adjustment by the phase adjusting unit 203 can be enhanced.

In the second embodiment, the phase adjustment for the subband signals ($A_{11}, A_{12}, \ldots, A_{1n}$) can be readily performed by shifting the time sequence of the subband signals ($A_{11}, A_{12}, \ldots, A_{1n}$) forward or backward by some sampling time.

In the second embodiment, the low frequency components are removed from the synthesized acoustic signal $E_1$ after the synchronizing unit 213 synchronizes the synthesized acoustic signal $E_1$. When all the frequency components including the low frequency components of the synthesized acoustic signal $E_1$ are used for the synchronization, it is easier to detect the lead point of synchronization, and it can reduce detection error of the lead point.

The preferred embodiments of the present invention were described above, but it is needless to mention that the present invention is not limited to the above embodiments.

For example, it is also feasible to establish a data embedding-extraction system as a combination of the data embedding device 100 of the first embodiment with the data extraction device 210 of the second embodiment, or a data embedding-extraction system as a combination of the data embedding device 200 of the second embodiment with the data extraction device 110 of the first embodiment.

The removing unit 113 in the first embodiment may be composed of an analog filter for filtering the input signal as it is, and configured to output a signal resulting from A/D conversion of the filtered signal.

The invention claimed is:

1. A data extraction device, comprising:

a processor configured to:

remove a low frequency component from an acoustic signal in which arbitrary transmission data is embedded, to generate a first low-frequency-removed acoustic signal;

synchronize the first low-frequency-removed acoustic signal in accordance with a frame unit used when said transmission data was embedded in the acoustic signal by detecting synchronization points in the first low-frequency-removed acoustic signal;

divide the first low-frequency-removed acoustic signal into frames on the basis of the synchronization points; and extract the transmission data from the synchronized first low-frequency-removed acoustic signal based on a correlation value obtained by multiplying each of the frames of the synchronized first low-frequency-removed acoustic signal by a predetermined spread code sequence, so as to identify a first bit value if the correlation value is plus at a synchronization point of the frame, and to identify a second bit value, if the correlation value is minus at a synchronization point of the frame, wherein the synchronizing includes calculating second correlation values between the first low-frequency-removed acoustic signal and the spread code sequence by iteratively shifting the first low-frequency-removed acoustic signal by several samples and detecting a point with a highest second correlation value as a synchronization point of the frame.

2. A data extraction device, comprising:

a processor configured to:

synchronize an acoustic signal in accordance with a frame unit used when arbitrary transmission data was embedded in the acoustic signal by detecting synchronization points in the acoustic signal;

remove a low frequency component from the synchronized acoustic signal to generate a second low-frequency-removed acoustic signal;

divide the second low-frequency-removed acoustic signal into frames on the basis of the synchronization points; and extract the transmission data from the second low-frequency-removed acoustic signal based on a correlation value obtained by multiplying each of the frames of the second low-frequency-removed acoustic signal by a predetermined spread code sequence, so as to identify a first bit value if the correlation value is plus at a synchronization point of the frame, and to identify a second bit value if the correlation value is minus at a synchronization point of the frame, wherein the synchronizing includes calculating second correlation values between the acoustic signal and the spread code sequence by iteratively shifting the acoustic signal by several samples and detecting a point with a highest second correlation value as a synchronization point of the frame.

3. A data extraction method performed by a data extraction device, the method comprising:

removing a low frequency component from an acoustic signal in which arbitrary transmission data is embedded to generate a first low-frequency-removed acoustic signal;

synchronizing the first low-frequency-removed acoustic signal in accordance with a frame unit used when said transmission data was embedded in the acoustic signal by detecting synchronization points in the first low-frequency-removed acoustic signal;

dividing the first low-frequency-removed acoustic signal into frames on the basis of the synchronization points; and extracting the transmission data from the synchronized first low-frequency-removed acoustic signal based on a correlation value obtained by multiplying each of the frames of the synchronized first low-frequency-removed acoustic signal by a predetermined spread code sequence so as to identify a first bit value if the correlation value is plus at a synchronization point of the frame, and to identify a second bit value, if the correlation value is minus at a synchronization point of the frame, wherein the synchronizing includes calculating second correlation values between the first low-frequency-removed acoustic signal and the spread code sequence by iteratively shifting the first low-frequency-removed acoustic signal by several samples and detecting a point with a highest second correlation value as a synchronization point of the frame.

4. A data extraction method performed by a data extraction device, the method comprising:

synchronizing an acoustic signal in accordance with a frame unit used when arbitrary transmission data was embedded in the acoustic signal by detecting synchronization points in the acoustic signal;

removing a low frequency component from the synchronized acoustic signal to generate a second low-frequency-removed acoustic signal;

dividing the second low-frequency-removed acoustic signal into frames on the basis of the synchronization points; and extracting the transmission data from the second low-frequency-removed acoustic signal based on a correlation value obtained by multiplying each of the frames of the second low-frequency-removed acoustic signal by a predetermined spread code sequence so as to identify a first bit value if the correlation value is plus at a synchronization point of the frame, and to identify a second bit value if the correlation value is minus at a synchronization point of the frame, wherein the synchronizing includes calculating second correlation values between the acoustic signal and the spread code sequence by iteratively shifting the acoustic signal by several samples and detecting a point with a highest second correlation value as a synchronization point of the frame.

* * * * *